B. KESSLER.
PAN HOLDER AND STOVE LID LIFTER.
APPLICATION FILED JUNE 10, 1907. RENEWED AUG. 5, 1908.
899,992.
Patented Sept. 29, 1908.
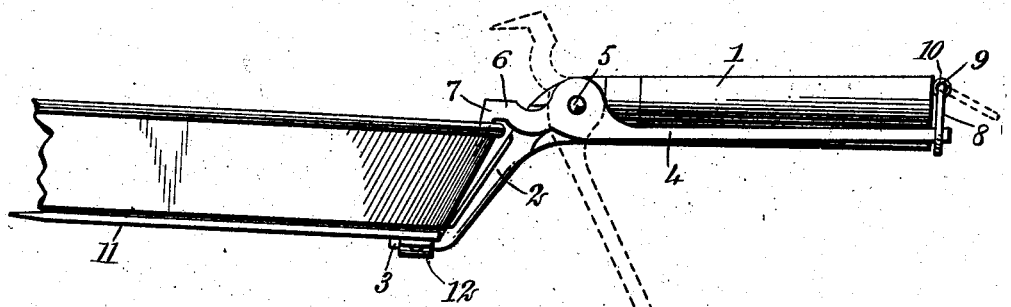
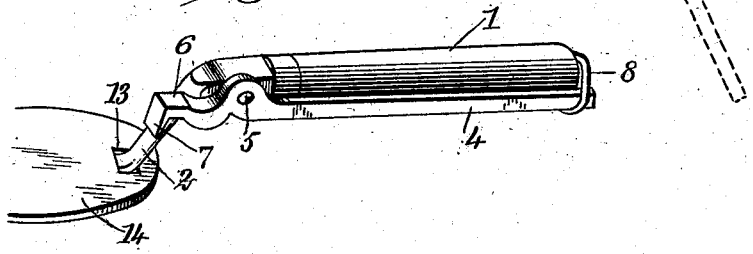
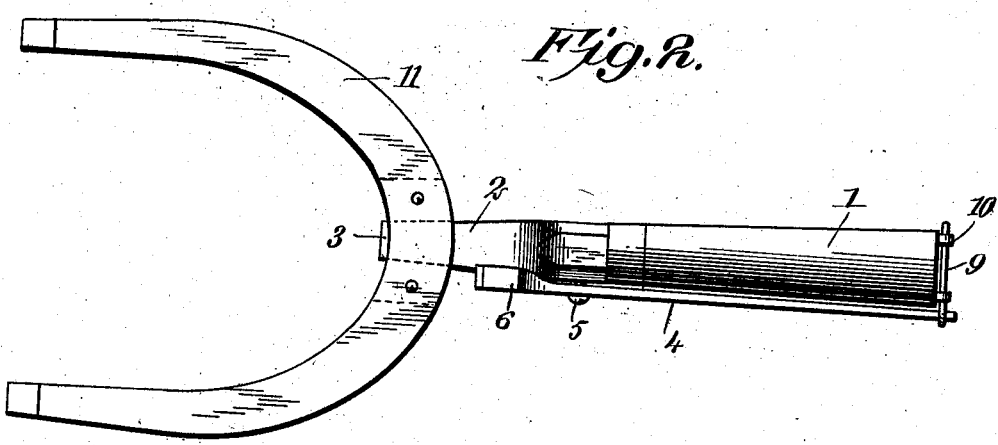
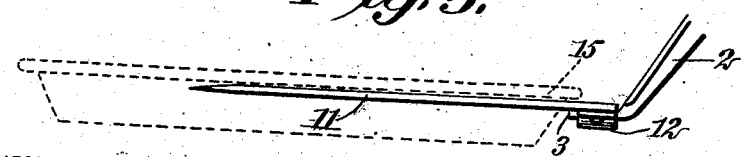
WITNESSES
Louis C. Starker
F. D. Ammen
INVENTOR
Benjamin Kessler
BY Munn & Co.
ATTORNEYS

UNITED STATES PATENT OFFICE.

BENJAMIN KESSLER, OF CABINET, IDAHO.

PAN-HOLDER AND STOVE-LID LIFTER.

No. 899,992.　　　Specification of Letters Patent.　　Patented Sept. 29, 1908.

Application filed June 10, 1907, Serial No. 378,189. Renewed August 5, 1908. Serial No. 447,140.

*To all whom it may concern:*

Be it known that I, BENJAMIN KESSLER, a citizen of the United States, and a resident of Cabinet, in the county of Bonner and State of Idaho, have invented a new and Improved Pan-Holder and Stove-Lid Lifter, of which the following is a full, clear, and exact description.

This invention relates to cooking range accessories, and the object of the invention is to produce a device which may be used conveniently as a holder or handle for pans not having permanent handles, and which can also be used as a stove lid lifter.
The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation showing a portion of a pan and illustrating the manner in which the device is used when employed as a pan holder; Fig. 2 is a plan of the device without the pan; Fig. 3 is a side elevation showing another application of the pan holder; and Fig. 4 is a perspective view showing the manner of using the device as a lid lifter.

Referring more particularly to the parts, 1 represents the handle of the device, which is formed at its forward extremity with a downwardly inclined extension or shank 2 which terminates in a horizontally projecting toe 3. On the side of the shank at the forward portion of the handle 1 a lever 4 is pivotally attached upon a suitable stud or pin 5, and this lever extends beyond the stud and is formed into a catch or finger 6 which has a downwardly projecting spur 7. The butt of the handle is provided with a keeper 8 which is in the form of a ring having a transverse bar 9 at the upper side thereof, which is mounted to swing like a hinge in eyes 10 attached to the handle. The toe 3 affords means for removably attaching a fork 11 to the handle, which fork has substantially the form shown in Fig. 2; that is, has form of a horseshoe, and is provided at its middle point and on its under face with a cleat or socket 12 through which the toe 3 is thrust from the rear, as indicated in Fig. 1.

The device is adapted to be used as a pan holder in the manner indicated in Fig. 1. The forward ends of the fork 11 are forced under the pan in the manner shown, so as to bring the edge of the pan near the shank 2. The lever 4 which is previously unlatched from the keeper 8, is allowed to assume the open position in which it is indicated in dotted lines. The lever is then closed so as to bring it into substantial alinement with the handle, and in this way the finger 6 moves downwardly so that the spur 7 projects down into the pan at the edge thereof. The keeper 8 is then allowed to engage the end of the lever 4, which preferably projects beyond the butt of the handle so as to facilitate this mode of operation. In this way the pan will evidently be held by the handle so that it can be moved from place to place.

A handle of this construction is very useful in handling hot pans in removing them from the oven or from the top of the range. When the fork 11 is detached from the handle, the handle may then be used as an ordinary stove lid lifter in the manner indicated in Fig. 4, the toe 3 being forced into the socket 13 in the stove lid 14, in the manner shown.

Where a pan of sufficiently small size is to be moved, such as a pie pan, the handle may be applied in the manner indicated in Fig. 3. When using the handle in this manner, the lever 4 is not used to hold the pan, but the fork is simply applied to the pan so that it extends partly around it, the weight of the pan being supported on the lip 15, as indicated in dotted lines in Fig. 3.

Having thus described my invention, I claim as new and desire to secure by Letters Patent:

1. A combination lid lifter and pan holder comprising a handle having a shank with a projecting toe adapted to be used as a lid lifter, a member removably attached to said toe and adapted to be thrust under a pan, said member having laterally projecting extensions preventing the pan from tipping to one side, and means movably carried by said handle for engaging the edge of a pan.

2. A combination lid lifter and pan holder comprising a handle having a projecting toe for lid-lifting, a removable fork having a socket receiving said toe and adapted to be thrust under a pan to support the same, a lever pivotally attached to said handle and having a spur adapted to engage the upper edge of the pan, and a keeper attached to said handle and adapted to secure the lever thereto.

In testimony whereof I have signed my name to this specification in the presence of two subscribing witnesses.

BENJAMIN KESSLER.

Witnesses:
 ROBT. S. McCRA,
 O. J. BAUDELIN.